Patented Dec. 18, 1945

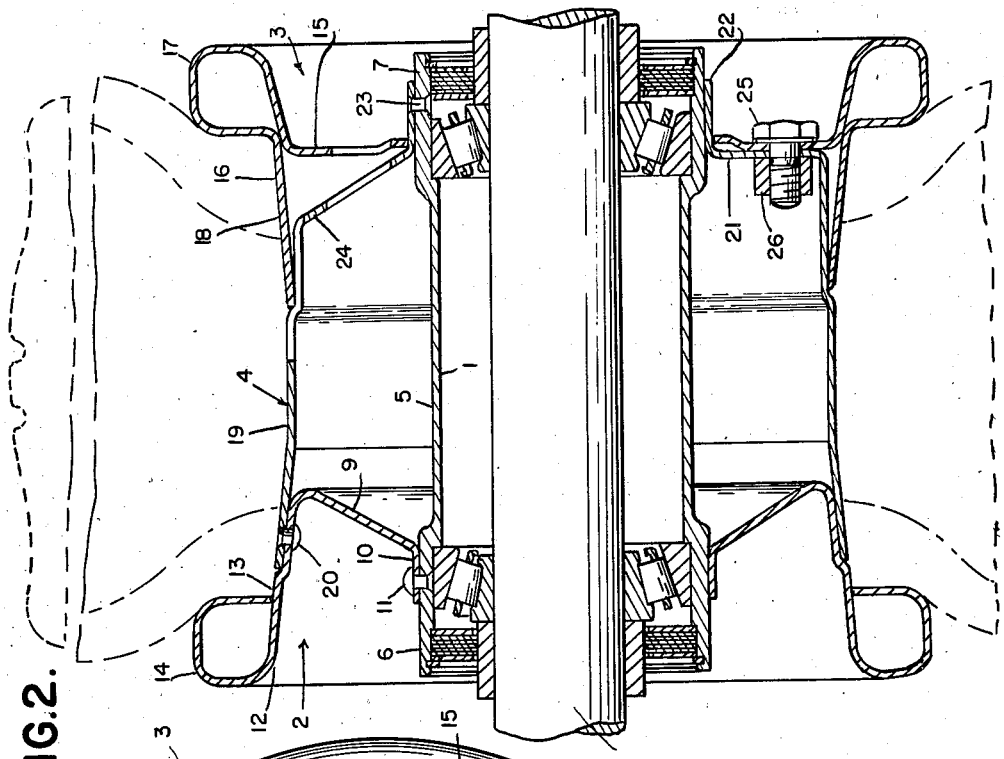
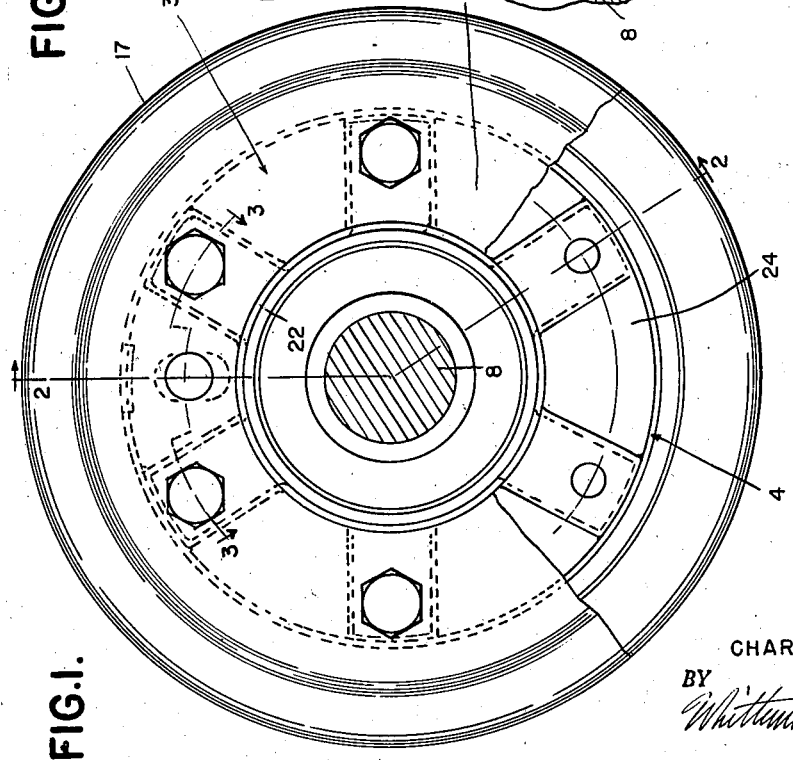
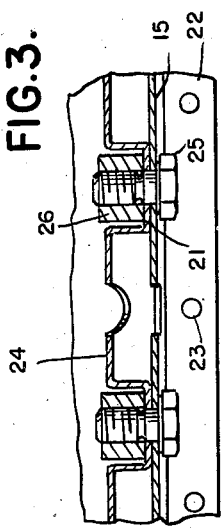
*INVENTOR.*
CHARLES W. SINCLAIR
BY
ATTORNEYS

2,391,200

UNITED STATES PATENT OFFICE 2,391,200

WHEEL

Charles W. Sinclair, Detroit, Mich., assignor to Kelsey-Hayes Wheel Company, Detroit, Mich., a corporation of Delaware Application December 13, 1943, Serial No. 514,127

4 Claims. (Cl. 301—63)

The invention relates to wheels and refers more particularly to wheels of that type designed for use with pneumatic tires of relatively wide base and relatively small bead diameter.

The invention has for one of its objects to provide a wheel which is relatively light in weight and strong in construction.

The invention has for another object to provide a wheel which is constructed to permit ready mounting and demounting of a pneumatic tire.

These and other objects of the invention will become apparent from the following description, taken in connection with the accompanying drawing, in which Figure 1 is a side elevation of a wheel embodying the invention;

Figure 2 is a cross section on the line 2—2 of Figure 1;

Figure 3 is a cross section on the line 3—3 of Figure 1.

The wheel is designed particularly for use on airplanes and comprises the hub 1, the inboard and outboard side elements 2 and 3, respectively, and the intermediate element 4. The hub 1 is formed of steel preferably by a series of drawing and upsetting and machining steps from a circular sheet steel blank. The hub is tubular and has the reduced central portion 5 and the enlarged inboard and outboard end portions 6 and 7, respectively. Suitable anti-friction bearings are arranged within the end portions 6 and 7 for mounting the wheel upon the axle 8.

The inboard and outboard side elements 2 and 3 are formed of sheet steel and each has a body portion and an integral rim portion with the rim portion provided with an integral tire retaining bead. More in detail, the inboard side element 2 has the generally radially extending body portion 9 which is formed at its radially inner edge with the annular flange 10 sleeved upon and secured to the inboard end portion 6 of the hub by suitable means, such as the rivets 11. The inboard side element also has the integral rim portion 12 which extends from the body portion in an inboard direction and comprises the rim base part 13 and the hollow tire retaining bead 14. The outboard side element 3 is formed with the generally radially extending body portion 15 and with the integral rim portion 16, the latter being provided with the integral hollow tire retaining bead 17 and the rim base part 18. The bead 17 connects the generally radial body portion 15 and the rim base part 18 and the rim base part extends generally axially in an inboard direction. The generally radial body portion 15 assists in supporting the body 17 and the rim base part 18, the body portion being encircled by the rim base part and connecting into the radially inner portion of the bead which is in supporting contact with the outboard portion of the rim base part.

The intermediate element 4 is formed of sheet steel and has the rim base portion 19 which telescopes over the outboard portion of the rim base part 13 of the inboard side element and is permanently secured thereto by suitable means, such as the rivets 20. The outboard portion is radially inwardly offset so that the rim base part 13 and the rim base portion 19 will have substantially flush radially outer faces at the inboard edge of the rim base portion. The intermediate element also has the generally radially extending load supporting portion 21 integral with the rim base portion 19 and provided at its radially inner edge with the annular flange 22 which is sleeved over the outboard end portion 7 of the hub and is secured thereto by suitable means, such as the rivets 23. For the purpose of reinforcing the supporting portion 21, it is formed with the angularly spaced radial ribs 24, the axial dimensions of which progressively increase radially outwardly and the inboard sides of which converge radially outwardly toward the body portion 9 at approximately the same angle to the hub. The rim base part 18 of the outboard side element telescopes over the outboard portion of the rim base portion 19 which is radially inwardly offset so that the rim base part 18 and the rim base portion 19 will have substantially flush radially outer faces at the inboard edge of the rim base part.

The outboard side element 3 is detachably secured to the intermediate element 4 to provide for ready mounting and demounting of the pneumatic tire. In detail, the body portion 15 of the outboard side element is detachably secured to the supporting portion 21 of the intermediate element by the bolts 25 and the nuts 26, the latter being permanently secured to the inboard side of the supporting portion 21 of the intermediate element between the radial ribs 24. The radially inner edge of the body portion 15 preferably slidably engages the annular flange 22 to pilot the outboard side element on the intermediate element and to relieve the bolts 25 from transverse shear.

What I claim as my invention is:

1. A wheel comprising a sheet metal side element having a body portion and an integral rim portion provided with a rim base part and a tire retaining bead, a sheet metal intermediate element having a rim base portion telescoped over and secured to said rim base part and an integral supporting portion, and a second sheet metal side element having a body portion directly secured to said supporting portion and having a rim base part telescoped over said rim base portion and an integral tire retaining bead between said second mentioned body portion and said second mentioned rim base part and having a portion in supporting contact with said second mentioned rim base part.

2. A wheel comprising axially spaced sheet metal side elements each formed of a body portion and an integral rim portion provided with a rim base part and a tire retaining bead, and a sheet metal intermediate element secured to said side elements, said intermediate element having a rim base portion telescopically engaging said rim base parts of said side elements between and spaced from said tire retaining beads and also having an integral generally radial supporting portion.

3. A wheel comprising a hub, a sheet metal side element having a body portion sleeved over and secured to said hub and an integral rim portion provided with a tire retaining bead, a sheet metal intermediate element having a rim base portion spaced from said tire retaining bead and telescoped over and secured to a part of said rim portion and an integral generally radial supporting portion sleeved over and secured to said hub, and a second sheet metal side element having a body portion detachably secured to said generally radial supporting portion and an integral rim portion comprising a rim base part and a tire retaining bead, said last mentioned rim base part being telescoped over a part of said rim base portion and said last mentioned tire retaining bead being spaced from said rim base portion.

4. A wheel comprising a hub, a sheet metal side element having a dished body portion sleeved over and secured to said hub and an integral rim portion provided with a rim base part and a hollow tire retaining bead, a sheet metal intermediate element having a rim base portion spaced from said bead and telescoped over and secured to said rim base part and an integral supporting portion sleeved over and secured to said hub, said supporting portion being formed with angularly spaced radial ribs having inboard sides converging radially outwardly toward said first mentioned dished body portion at approximately the same angle to the hub, and a second sheet metal side element having a body portion detachably secured to said supporting portion, and an integral rim portion comprising a rim base part and a hollow tire retaining bead connecting said rim base part and last mentioned body portion, said last mentioned rim base part encircling said last mentioned body portion and said last mentioned bead having a radially inner portion in supporting contact with said last mentioned rim base part, said last mentioned rim base part being telescoped over a part of said rim base portion.

CHARLES W. SINCLAIR.